US011157051B2

(12) United States Patent
Lee et al.

(10) Patent No.: US 11,157,051 B2
(45) Date of Patent: Oct. 26, 2021

(54) SYSTEMS AND METHODS OF DYNAMIC THERMAL MANAGEMENT FOR ENHANCING THERMAL PERFORMANCE IN 5G ENABLED DEVICES

(71) Applicant: QUALCOMM Incorporated, San Diego, CA (US)

(72) Inventors: Kwangyoon Lee, San Diego, CA (US); Adam Cunningham, Escondido, CA (US); Melanie Dolores Oclima, San Diego, CA (US); Ronald Alton, Oceanside, CA (US); Jon James Anderson, Boulder, CO (US); Heekab Shin, San Diego, CA (US); Henri Begin, Lyons, CO (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 16/654,166

(22) Filed: Oct. 16, 2019

(65) Prior Publication Data

US 2020/0125148 A1 Apr. 23, 2020

Related U.S. Application Data

(60) Provisional application No. 62/747,227, filed on Oct. 18, 2018.

(51) Int. Cl.
*G06F 1/20* (2006.01)
*G06F 1/324* (2019.01)
*H04W 52/02* (2009.01)
*G06F 1/3206* (2019.01)
*G06F 1/3296* (2019.01)

(52) U.S. Cl.
CPC .............. *G06F 1/206* (2013.01); *G06F 1/324* (2013.01); *G06F 1/3206* (2013.01); *G06F 1/3296* (2013.01); *H04W 52/0287* (2013.01)

(58) Field of Classification Search
CPC ........ G06F 1/206; G06F 1/3206; G06F 1/324; G06F 1/3296; H04W 52/0287
See application file for complete search history.

(56) References Cited

U.S. PATENT DOCUMENTS

2016/0239057 A1* 8/2016 Kocagoez ............. G06F 1/3287

* cited by examiner

*Primary Examiner* — Gary Collins
(74) *Attorney, Agent, or Firm* — Qualcomm Incorporated

(57) ABSTRACT

Various aspects of the present disclosure include methods, components and wireless devices configured to determine appropriate generalized system-wide thermal management policies and settings in wireless devices depending upon whether communication activities are driving or otherwise causing thermal conditions. In various aspects, a processor may determine workload characteristics and select and apply an appropriate thermal management policy/solution (or thermal configuration, settings etc.) based on the determine workload characteristics. The processor may determine workload characteristics based upon data from two or more temperature sensors within the wireless device. The processor may select a generalized system-wide thermal management policy suitable for operating when communication activities (e.g., 5G communication activities) are generating so much heat that CPU-centric thermal management policies are in appropriate.

20 Claims, 9 Drawing Sheets

SYSTEMS AND METHODS OF DYNAMIC THERMAL MANAGEMENT FOR ENHANCING THERMAL PERFORMANCE IN 5G ENABLED DEVICES

RELATED APPLICATIONS

This application claims the benefit of priority to U.S. Provisional Application No. 62/747,227, entitled "Systems and Methods of Dynamic Thermal Management for Enhancing Thermal Performance in 5G Enabled Devices" filed Oct. 18, 2018, the entire contents of which are hereby incorporated by reference.

BACKGROUND

Cellular and wireless communication technologies have seen explosive growth over the past several years. This growth has been fueled by better communications hardware, larger networks, and more reliable protocols. Wireless service providers are now able to offer their customers an ever-expanding array of features and services, and provide users with unprecedented levels of access to information, resources, and communications. To keep pace with these service enhancements, wireless devices (e.g., cellular phones, tablets, laptops, etc.) have become faster and more powerful than ever, and now commonly include multiple processors, system-on-chips (SoCs), memories, and other resources (e.g., power rails, etc.) that support high-speed communications and allow device users to execute complex and power intensive software applications on their wireless devices.

While the performance demands of wireless devices are increasing, device users expect to maintain certain levels of responsiveness, battery life, and surface temperature on their wireless devices. Maintaining these expected levels of performance on a wireless device may result in increased power consumption on the wireless device, which if not controlled may increase the surface temperature of the device to an uncomfortable or unsafe degree. Thus, it is important to implement effective power and thermal management solutions that adequately manage the various power consumption and thermal issues that may arise in modern wireless devices.

SUMMARY

Various aspects of the present disclosure include methods of managing thermal energy in a wireless device, which may include determining, by a processor of the wireless device, based on inputs from two or more temperature sensors whether a workload of the wireless device is a modem-centric workload, and applying, by the processor, a thermal management policy configured for managing thermal characteristics of modem workloads in response to determining that the workload is a modem-centric workload.

Some aspects may further include receiving first temperature values by the processor from a first temperature sensor that is sensitive to activities of a 5G modem, and receiving second temperature values by the processor from a second temperature sensor that is less sensitive to the activities of the 5G modem, in which determining based on inputs from two or more temperature sensors whether a workload of the wireless device is a modem-centric workload is based on inputs from the first and second temperature sensors.

In some aspects, applying the thermal management policy configured for managing thermal characteristics of modem workloads in response to determining that the workload is a modem-centric workload may include throttling a component of the wireless device. In some aspects, throttling the component may include adjusting a clock frequency of the component or adjusting a power level of the component.

Some aspects may further include determining, by the processor, one or more temperature profile characteristics based on the inputs from two or more temperature sensors. Some aspects may further include determining, by the processor, whether a workload present on the wireless device is a central processing unit centric workload or a modem-centric workload based on the determined temperature profile characteristics.

In some aspects, determining whether a workload present on the wireless device is a central processing unit centric workload or a modem-centric workload based on the determined temperature profile characteristics may include determining, by the processor, a difference in variation between values received from a neutral temperature sensor and values received from a modem temperature sensor based on the determined temperature profile characteristics, determining, by the processor, whether there has been an increase in the activity of the 5G modem processor based on the difference in variation between values received from a neutral temperature sensor and values received from a modem temperature sensor, determining, by the processor, whether the increase in the activity of the 5G modem processor exceeds a threshold value, and determining, by the processor, the that the workload present on the wireless device is a modem-centric workload in response to determining that the increase in the activity of the 5G modem processor exceeds a threshold value.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

DETAILED DESCRIPTION

Figure 1:
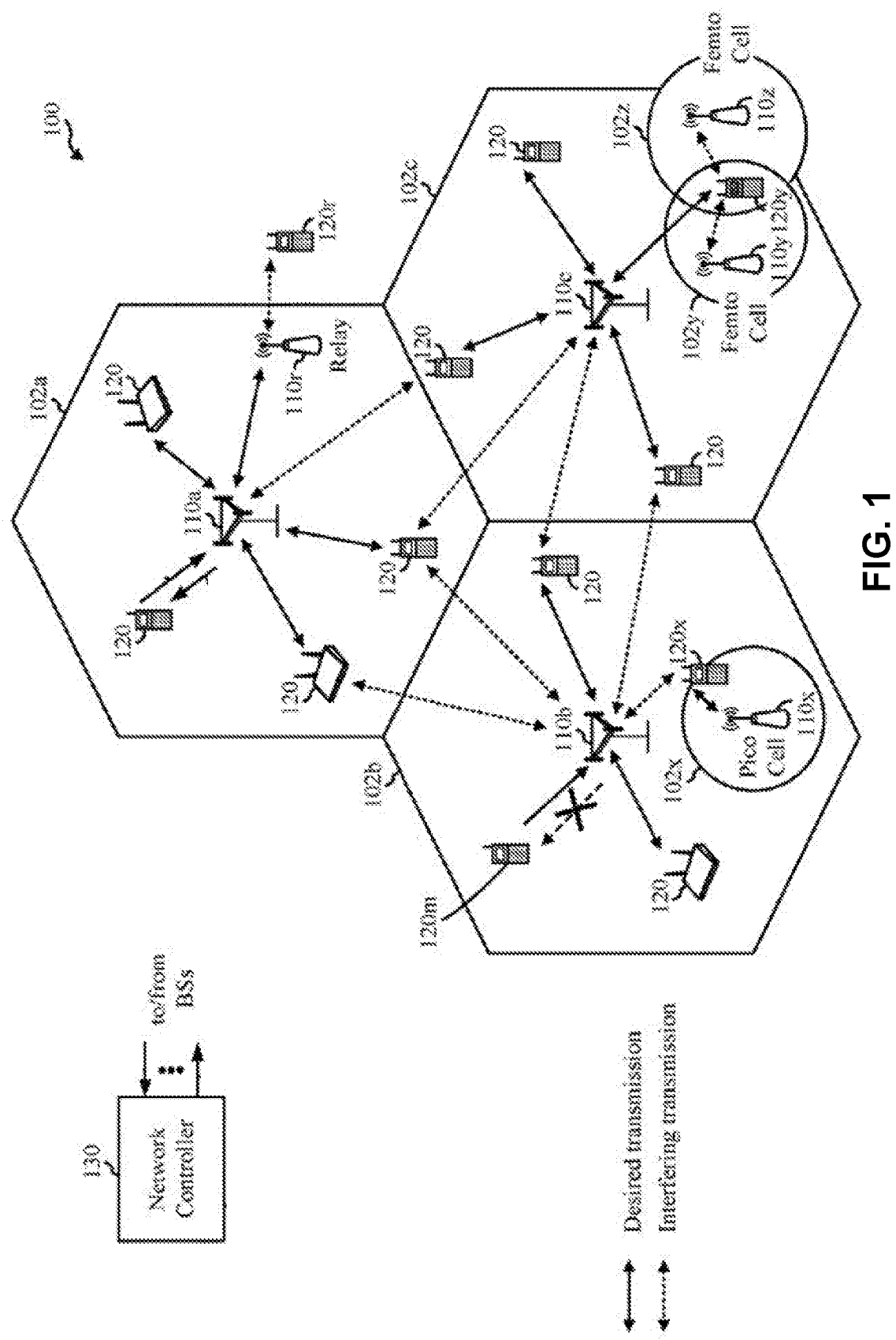
FIG. 1 is a system block diagram conceptually illustrating an example telecommunications system.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Generally, components and circuitry within a wireless device generate heat or thermal energy, which at excessive levels may be detrimental to the wireless device and uncomfortable or even injurious to users. The amount of thermal energy that is generated may vary depending upon the operating conditions and computing activities. For example, in an instance in which a wireless device is wirelessly transmitting data for a sustained time period at a high power-level, the power amplifier that feeds the antenna may generate a potentially detrimental amount of thermal energy. In addition, processors within the wireless device may generate a potentially detrimental amount thermal energy when the processing burden is high.

Wireless devices have been configured with thermal management solutions or policies to ensure the temperature of wireless devices do not reach unsafe or uncomfortable levels, as well as to avoid operating components at temperatures that may shorten the operating life of the device. Thermal management policies may be difficult if not feasible to implement on a chip-by-chip basis, so a generalized system-wide thermal management policy is best. In many operating situations, the central processing unit (CPU) and associated components is a primary heat generator, so conventional thermal management policies include power management of such components (e.g., controlling the CPU clock frequency). However, new communication protocols and systems, including 5G, may result in changes in thermal characteristics and heat generation of wireless devices in ways that may render conventional thermal management policies unsuitable when certain communication activities are underway. Conventional generalized system-wide thermal management policies may be preferable for some operation conditions and circumstances, especially conditions in which the CPU is the dominate source of heat in the wireless device. Generalized system-wide thermal management policies suitable for managing device temperatures when the communication components (e.g., the modem) may be most appropriate when the communication components become dominant heat sources or render conventional thermal management policies insufficient, but may be in appropriate at other times. Such conditions are anticipated when 5G communication components are dominating device activities (referred to herein as a "5G-centric workload"). However, 5G capable wireless devices should also be capable of operating efficiently when thermal conditions are dominated by CPU activities (referred to herein as a "CPU-centric workload") when conventional thermal management policies are more appropriate.

Various aspects of the present disclosure include methods, and components and wireless devices configured to implement the methods, for determining appropriate generalized system-wide thermal management policies and settings in wireless devices depending upon whether communication activities are driving or otherwise causing thermal conditions to exceed desirable levels or thresholds. In various aspects, a wireless device processor may be configured to determine workload characteristics and select and apply an appropriate thermal management policy/solution (or thermal configuration, settings etc.) based on the determine workload characteristics. In various aspects, a wireless device processor may be configured to determine workload characteristics based upon data from two or more temperature sensors within the wireless device, such as from a first temperature sensor on or near the CPU and a second temperature sensor positioned to measure the internal temperature of the wireless device. Based on differences in temperature data (e.g., actual temperature, rate of heating or cooling, etc.) between the two or more temperature sensors, the processor may select a generalized system-wide thermal management policy suitable for operating when communication activities are generating so much heat that CPU-centric thermal management policies are in appropriate. For example, the wireless device may select and apply a first system-wide thermal management solution for CPU-centric workload, detect the presence of a modem-centric or 5G-centric workload on the device, and select and apply a different thermal management policy or solution in response to detecting the presence of the modem-centric or 5G-centric workload on the device.

By intelligently selecting and applying different system-wide thermal management solutions based on the types of workloads (e.g., CPU-centric vs. 5G-centric) present on the device, the wireless device may intelligently throttle the components in the wireless device to operate at a level that maintains the surface temperature of the wireless device within a specific range, balances tradeoffs between performance and power consumption on the wireless device, and achieves improved performance per watt of expended power. The ability to select between two different generalized system-wide thermal management solutions depending upon whether operating activities are CPU-centric or modem/5G-centric allows thermal conditions to be addressed by fewer generalized system-wide thermal management solutions (e.g., two alternative solutions) than would be the case if specific thermal management solutions were developed for each anticipated level or combination of CPU and communication activities. For these reasons, the various aspects improve the overall performance and functioning of wireless devices.

The term "wireless device" is used herein to refer to any one or all of cellular telephones, smartphones, portable computing devices, personal or mobile multimedia players, personal data assistants (PDA's), laptop computers, tablet computers, smartbooks, IoT devices, palm-top computers, wireless electronic mail receivers, multimedia Internet enabled cellular telephones, wireless gaming controllers, and similar electronic devices which include a memory, wireless communication components and a programmable processor for which performance. While the various aspects are particularly useful in hand held devices that have limited resources and run on battery power, such as smartphones, various aspects are generally useful in any computing device that includes wireless communication components and a processor and executes application programs.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, internet protocol (IP) core, graphics processing unit (GPU) core, etc.) configured to read and execute program instructions. A SOC may include multiple multi-core processors, and each processor in an SOC may be referred to as a core. The term "multiprocessor" may be used herein to refer to a system or device that includes two or more processing units configured to read and execute program instructions.

The term "workload" is used here to refer generally to a processing burden, or percentage of processing burden, associated with one or more components (e.g., CPU, GPU, modem processor, etc.) within the wireless device.

In the various aspects, a wireless device may be equipped with a thermal management system that is operable to decrease thermal energy generation at the expense of performance or increase performance at the expense of thermal energy generation so as to maintain wireless device internal and external temperatures within various limits. The thermal management system may include or communicate with various temperature sensors that are positioned in or near heat generating components of the wireless device. The thermal management system may be configured to monitor the temperature sensors to determine whether the wireless device or portion thereof has reached a threshold or critical temperature. When a reading of the temperature sensor indicates that the wireless device could reach or exceed a temperature limit, the thermal management system may initiate an action intended to reduce thermal energy production or otherwise mitigate the negative effects of the excess thermal energy. For example, the thermal management system may throttle (e.g., reduce operating frequency or periodically pause an operation) or temporarily reduce power to some of the components in the wireless device in order to allow the wireless device to dissipate excess thermal energy. The thermal management system may also throttle or temporarily reduce the processing clock frequency of one or more processing components (e.g., CPU, GPU, etc.), reduce display brightness settings, and/or perform other similar operations to dissipate excess thermal energy.

Throttling the processing clock frequency reduces the rate of work accomplished by the processors. As such, while the throttling operations may cause the device to dissipate excess thermal energy, such operations may also reduce the performance and/or responsiveness of the wireless device. Therefore, it is important for thermal management system to balance tradeoffs between performance and power consumption on the wireless device.

In order to balance tradeoffs between performance and power consumption on the wireless device, the thermal management system may implement a generalized system-wide thermal management policy that accounts for the power and performance characteristics of the power consuming and heat generating components in the wireless device. In some aspects, the wireless device may be configured to determine or select the thermal management policy based on a power budget. That is, wireless devices may be limited by restricted power budgets that deplete as power is consumed by the wireless device. The thermal management system may determine or set the available power budget (e.g., in units proportional to Watts, etc.) based on the available power resources, an estimate of the leakage power levels, relative importance or influence of workloads and components in the wireless device, information included in a look up table, etc. In some aspects, thermal management system may be configured to determine the power budget for the wireless device based on a thermal power envelope.

A thermal power envelope may include a collection of data points that identify the relationships between surface/skin temperatures and different power levels. The thermal management system of the wireless device may use a thermal power envelope to determine the amount of power that the wireless device or a component in the wireless device may sustain at a given surface temperature level. Said another way, the thermal management system may use the thermal power envelope to identify a maximum rate of aggregate power consumption at which the surface temperature of the wireless device may be maintained at or below a certain threshold (e.g., surface temperature threshold, etc.). The threshold may be predefined or set in advance by the manufacturer or user of the device. The threshold may also be determined dynamically, such as based on the ambient environmental temperature to which the wireless device is exposed. In an aspect, the threshold may be set above an upper range of expected ambient environmental temperatures.

Many wireless devices include an SOC that operates as the device's CPU (herein "SOC-CPU"). Historically, the SOC-CPU has been the dominant power consuming and heat generating component in the device. As such, wireless device thermal management systems may be configured to determine and set thermal management policies based on thermal power envelopes that consider only temperature sensors on and/or workloads present on the SOC-CPU. Such thermal power envelopes may be determined based on a "worst case" power scenario of a CPU workload of the SOC-CPU.

The emergence of 5G technologies has changed some of the assumptions and paradigms associated with the designing thermal management systems. For example, to support legacy applications and communications, a 5G capable wireless device may be equipped with a second SOC that largely operates independent of the other components in the wireless device. The second SOC may include a 5G modem processor, a phaser module, a power amplifier, and other modem related heat generating units that may impact the power budget or amount of power that may be consumed by the components in the SOC-CPU. In addition, the dominant power consuming and heat generating components (e.g., 5G modem, etc.) may be positioned outside or exterior to the SOC-CPU but positioned close enough to the SOC-CPU to increase or exacerbate the surface temperature of the SOC-CPU or of the wireless device. Accordingly, in some aspects, the thermal management system may be configured to generate or update the thermal power envelopes to account for the changes in power budgets and surface temperatures caused via the inclusion of 5G components and/or a second SOC in the wireless device.

A 5G capable wireless device may be equipped with a 5G modem that supports download speeds of up to 5 Gbps, which is five times faster than the download speeds provided by fastest non-5G modems available on the market today. While the 5G modem may be external to the SOC-CPU, the SOC-CPU may remain responsible for performing data packet processing operations for the 5G communications. Due to the speeds and volumes associated with 5 Gbps communications, such data packet processing operations may consume more power than the "worst case" power scenario of the CPU workloads in wireless devices that do not have 5G capabilities. Accordingly, in some aspects, the thermal management system may be configured to generate or update the thermal power envelopes that better account for the changes in CPU workloads associated with the inclusion and use of 5G components in the wireless device.

More stressful CPU workloads and neighboring heat sources (e.g., the second SOC with 5G components) may lead to a reduced thermal power envelope (or lower power budget) for the SOC-CPU. In addition, existing thermal power envelope methods of thermal tuning do not account for substantial changes in workloads, such as when the wireless device transitions from a CPU-centric workload to a modem-centric or 5G-centric workload. Moreover, there are many components in a 5G capable wireless devices involved in executing modem workloads. Over throttling any one of these components may create a bottleneck effect in the other components outside the bottleneck are operate at a higher operating level than required. This may lead to inefficient and ineffective thermal performance of the wireless device.

For all these reasons, configuring the thermal management system of a wireless device in accordance with the various aspects to select and implement a generalized system-wide thermal management solution that accounts for whether CPU-centric workloads or 5G-centric workloads are driving temperature levels, thereby enabling managing of the heat generation of components and operating levels that balances tradeoffs between performance and power consumption on the wireless device and improving the overall performance and functioning of the wireless device.

Various aspects include wireless devices that are equipped with a thermal management system that is configured to intelligently select and apply thermal management polices based on the types of workloads executing on the device.

In some aspects, the wireless device may be configured to determine whether a workload present on the device is a CPU-centric workload or a 5G-centric workload based on modem temperatures and/or temperature readings collected from temperature sensors on one or more components within the wireless device. In response to determining that the workload is a CPU-centric workload, the wireless device may select and apply a thermal management policy based on the "worst case" power scenario of the CPU-centric workloads. In response to determining that the workload is a 5G-centric workload, the wireless device may select and apply a thermal management policy that is appropriate for managing 5G thermal performance and/or that accounts for the changes in power budgets, surface temperatures, and CPU workloads caused by 5G components or a second SOC.

In some aspects, a processor within the wireless device may be configured to determine whether a workload present on the device is a CPU-centric workload or a 5G-centric workload based on an aggregate value of temperature from temperature sensors positioned at different locations within the wireless device. For example, the thermal management system may collect first temperature sensor readings from a temperature sensor positioned on the SOC-CPU, collect second temperature sensor readings from a temperature sensor positioned on the 5G-modem, apply a first weight value to the first temperature sensor readings, apply a second weight value to the second temperature sensor readings, aggregate the weighted first and second temperature sensor readings to generate an aggregated value, and determine whether the workload present on the device is a CPU-centric workload or a 5G-centric workload based on the aggregated value.

In some aspects, the wireless device may be configured to apply a thermal management policy that is optimized for 5G thermal performance in response to determining that a 5G-centric workload is present on the device. The wireless device may determine that a 5G-centric workload is present on the device based on modem temperatures and/or temperature readings collected from one or more components within the wireless device. In response to determining that a 5G-centric workload is not present on the device, the wireless device may select and apply a conventional thermal management policy, such as a thermal management policy that is determined based on the "worst case" power scenario of CPU-centric workloads. In response to determining that a 5G-centric workload is present on the device, the wireless device may select and apply a thermal management policy that is configured to manage thermal performance during 5G communication activities and/or that accounts for the changes in power budgets, surface temperatures, and CPU workloads caused by the 5G components or second SOC.

In some aspects, applying a thermal management policy that is configured to manage thermal performance during 5G communication activities may lower the operating level of one or more components in the SOC-CPU to decrease thermal energy generation in the SOC-CPU. For example, applying the thermal management policy configured to manage thermal performance during 5G communication activities may lower the operating frequency of one or more processors in the SOC-CPU.

In some aspects, applying a thermal management policy configured to manage thermal performance during 5G communication activities may increase the operating level of one or more components in the SOC-CPU to improve the performance of the wireless device. For example, thermal management policy for 5G-centric workloads may increase the operating frequency of one or more processors in the SOC-CPU.

In some aspects, the wireless device may be equipped with at least one modem temperature sensor that is highly sensitive to modem activity. In some aspects, the temperature sensor may be included in the second SOC. In some aspects, the temperature sensor may be included in, positioned near, and/or coupled to the 5G modem processor in the second SOC.

In some aspects, the wireless device may be equipped with at least one neutral temperature sensor or a temperature sensor that is not highly sensitive to modem activity. This temperature sensor may be positioned on a board supporting both SOC-CPU and the second SOC, in the SOC-CPU or the second SOC, or positioned relative to the 5G modem processor so that it is not highly sensitive to modem events or temperature changes caused by changes in modem activity.

In some aspects, a processor of the wireless device may be configured to monitor the temperature sensors, their current temperature readings, and the respective rates at which their temperature readings change. The processor of the wireless device may determine a temperature gradient value (or an aggregated temperature value) based on the difference between the rate at which temperature values collected from the neutral temperature sensor change and the rate at which the temperature values collected from the modem temperature sensor change. In some aspects, the wireless device may determine a difference between the neutral temperature sensor and the modem temperature sensor. In some aspects, the wireless device may determine a variance between neutral temperature sensor readings and the modem temperature sensor readings. A large difference in temperature readings, a large temperature gradient, or a large difference in variation between the values received from the neutral temperature sensor and the values received from the modem temperature sensor may indicate that there has been a significant increase in the activity or workload of the 5G modem processor thus the wireless device is experiencing a 5G-centric workload. The wireless device may determine that the workload is a CPU-centric workload in response to determining that the temperature difference or temperature gradient does not exceed the threshold value.

FIG. 1 illustrates an example wireless network 100, such as a new radio (NR) or 5G network, in which aspects of the present disclosure may be performed. For example, the system in a package (SIP) 200 illustrated in FIG. 2 may include a 5G modem processor that is configured to send and receive information via the wireless network 100. As another example, the smartphone 900 illustrated in FIG. 2 may send and receive information via the wireless network 100.

In the example illustrated in FIG. 1, the wireless network 100 includes a number of base stations 110 and other network entities. A base station may be a station that communicates with wireless devices. Each base station 110 may provide communication coverage for a particular geographic area. In 3GPP, the term "cell" can refer to a coverage area of a Node B and/or a Node B subsystem serving this coverage area, depending on the context in which the term is used. In new radio (NR) or 5G network systems, the term "cell" and eNB, Node B, 5G NB, AP, NR base station, NR base station, or transmission and reception point (TRP) may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A base station may provide communication coverage for a macro cell, a pico cell, a femto cell, and/or other types of cell. A macro cell may cover a relatively large geographic area (e.g., several kilometers in radius) and may allow unrestricted access by wireless devices with service subscription. A pico cell may cover a relatively small geographic area and may allow unrestricted access by wireless devices with service subscription. A femto cell may cover a relatively small geographic area (e.g., a home) and may allow restricted access by wireless devices having association with the femto cell (e.g., wireless devices in a Closed Subscriber Group (CSG), wireless devices for users in the home, etc.). A base station for a macro cell may be referred to as a macro base station. A base station for a pico cell may be referred to as a pico base station. A base station for a femto cell may be referred to as a femto base station or a home base station. In the example shown in FIG. 1, the base stations 110a, 110b and 110c may be macro base stations for the macro cells 102a, 102b and 102c, respectively. The base station 110x may be a pico base station for a pico cell 102x. The base stations 110y and 110z may be femto base station for the femto cells 102y and 102z, respectively. A base station may support one or multiple (e.g., three) cells.

The wireless network 100 may also include relay stations. A relay station is a station that receives a transmission of data and/or other information from an upstream station (e.g., a base station or a wireless device) and sends a transmission of the data and/or other information to a downstream station (e.g., a wireless device or a base station). A relay station may also be a wireless device that relays transmissions for other wireless devices. In the example shown in FIG. 1, a relay station 110r may communicate with the base station 110a and a wireless device 120r in order to facilitate communication between the base station 110a and the wireless device 120r. A relay station may also be referred to as a relay base station, a relay, etc.

The wireless network 100 may be a heterogeneous network that includes base stations of different types, e.g., macro base station, pico base station, femto base station, relays, etc. These different types of base stations may have different transmit power levels, different coverage areas, and different impact on interference in the wireless network 100. For example, macro base station may have a high transmit power level (e.g., 20 Watts) whereas pico base station, femto base station, and relays may have a lower transmit power level (e.g., 1 Watt).

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for both synchronous and asynchronous operations.

A network controller 130 may be coupled to a set of base stations and provide coordination and control for these base stations. The network controller 130 may communicate with the base stations 110 via a backhaul. The base stations 110 may also communicate with one another, e.g., directly or indirectly via wireless or wireline backhaul.

The wireless devices 120 (e.g., 120x, 120y, etc.) may be dispersed throughout the wireless network 100, and each wireless device may be stationary or mobile. Some wireless devices may be considered evolved or machine-type communication (MTC) devices or evolved MTC (eMTC) devices. MTC and eMTC wireless devices include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some wireless devices may be considered Internet-of-Things (IoT) devices.

In FIG. 1, a solid line with double arrows indicates desired transmissions between a wireless device and a serving base station, which is a base station designated to serve the wireless device on the downlink and/or uplink. A dashed line with double arrows indicates interfering transmissions between a wireless device and a base station.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While some aspects of the examples described herein may be associated with LTE technologies, aspects of the present disclosure may be applicable with other wireless communications systems, such as new radio (NR) or 5G network. NR may utilize OFDM with a cyclic prefix (CP) on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., downlink (DL) or uplink (UL)) for data transmission and the link direction for each subframe may be dynamically switched. Each subframe may include DL/UL data as well as DL/UL control data. Beamforming may be supported and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per wireless device. Multi-layer transmissions with up to 2 streams per wireless device may be supported. Aggregation of multiple cells may be supported with up to 8 serving cells. Alternatively, NR may support a different air interface, other than an OFDM-based.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a wireless device may function as a scheduling entity, scheduling resources for one or more subordinate entities (e.g., one or more other wireless devices). A wireless device may also function as a scheduling entity in a peer-to-peer (P2P) network, and/or in a mesh network. In a mesh network example, wireless devices may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

A NR base station (e.g., eNB, 5G Node B, Node B, transmission reception point (TRP), access point (AP)) may correspond to one or multiple base stations. NR cells may be configured as access cell (ACells) or data only cells (DCells). For example, the radio access network (RAN) (e.g., a central unit or distributed unit) may configure the cells. DCells may be cells used for carrier aggregation or dual connectivity, but not used for initial access, cell selection/reselection, or handover. NR base stations may transmit downlink signals to wireless devices indicating the cell type. Based on the cell type indication, the wireless device may communicate with the NR base station. For example, the wireless device may determine NR base stations to consider for cell selection, access, handover (HO), and/or measurement based on the indicated cell type.

Figure 2:
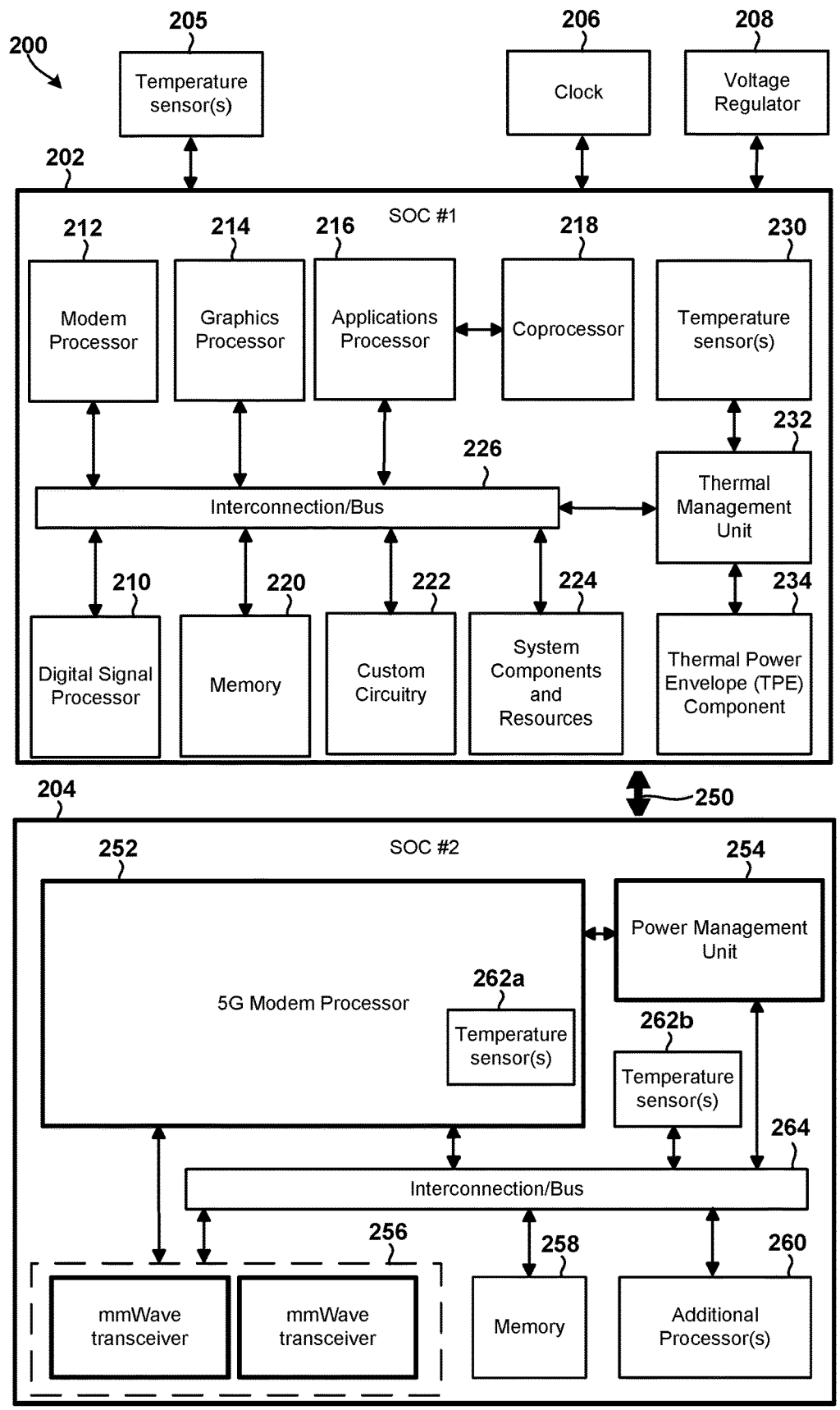
FIG. 2 is a component block diagram illustrating a computing system that may be configured to implement dynamic thermal management for enhancing thermal performance in 5G enabled devices in accordance with various aspects of the present disclosure.
Figure 9:
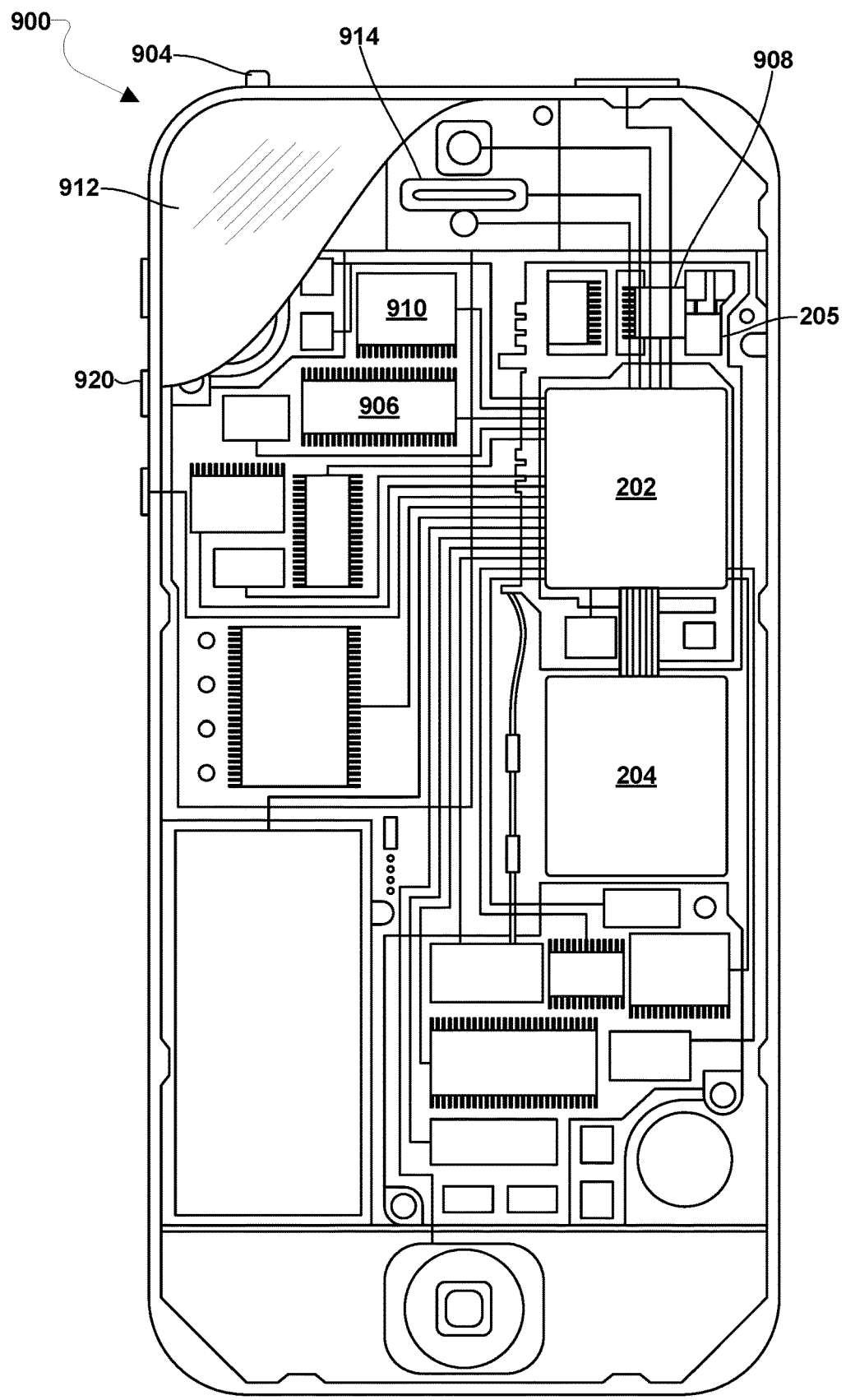
FIG. 9 is a component block diagram of a wireless device suitable for implementing dynamic thermal management for enhancing thermal performance in 5G enabled devices in accordance with various aspects of the present disclosure.

The various aspects may be implemented on a number of single processor and multiprocessor computer systems, including a system-on-chip (SOC) or system in a package (SIP). FIG. 2 illustrates an example computing system or SIP 200 architecture that may be used in wireless devices (e.g., the smartphone 900 illustrated in FIG. 9) implementing the various aspects.

In the example illustrated in FIG. 2, the SIP 200 includes a two SOCs 202, 204, a temperature sensor 205, a clock 206, and a voltage regulator 208. In some aspects, the first SOC 202 operate as central processing unit (CPU) of the wireless device that carries out the instructions of software application programs by performing the arithmetic, logical, control and input/output (I/O) operations specified by the instructions. In some aspects, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

In the example illustrated in FIG. 2, the first SOC 202 includes a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 includes a 5G modem processor 252, a power management unit 254, temperature sensors 262a 262b, an interconnection/bus module 264, a plurality of mmWave transceivers 256, memory 258, and various additional processors 260, such as an applications processor, packet processor, etc.

In some aspects, one or more of the temperature sensors 230, 262a, 262b may be a temperature sensor that is highly sensitive to temperature changes caused by activities of the 5G modem processor 252. In some aspects, one or more temperature sensors 205, 230, 262b may be a neutral temperature sensor or a temperature sensor that is not highly sensitive to temperature changes caused by activities of the 5G modem processor 252.

The SIP 200 may include various additional temperature sensors that monitor surface and/or component temperatures in the device. The temperature sensors may be placed at the component level (e.g., directly within the component, etc.) or elsewhere on the SIP or wireless device (e.g., so they're not directly within the component). The temperature sensors placed at the component level may be configured to monitor junction temperature. The temperature sensors that are not placed at the component level may be configured to monitor the skin/surface temperature of the wireless device. Sensors placed at the component level may be highly sensitive to changes in temperature (e.g., have a steep temperature slope/ramp, etc.) so that they may detect and respond to temperature events quickly. The non-component level temperature sensors may be less sensitive to changes in heat generation by the CPU and/or 5G communication components, and thus have a slower temperature slope/ramp that is more suitable for use in monitoring surface temperatures within the wireless device. Examples of the types of temperature sensors that may be included in the SIP 200 in the various aspects include thermally sensitive resistors ("thermistors"), negative temperature coefficient (NTC) thermistors, resistance temperature detectors (RTDs), thermocouples, and semiconductor-based sensors.

The thermal power envelope (TPE) component 234 may be configured to generate, manage, compare and/or evaluate one or more TPE values. A TPE value may include or represent a collection of data points that identify relationships between skin temperatures and power over time. The TPE value may identify a maximum rate of aggregate power consumption at which the surface/skin temperature of the wireless device may be maintained at or below a certain threshold value (e.g., skin temperature threshold value, etc.).

The TPE component 234 may use TPE values to evaluate the wireless device's thermal performance and thermal mechanical design, i.e., how much power the wireless device (or its components) can dissipate while operating for a sustained time at a given surface/skin temperature. For example, the TPE component 234 may generate a TPE value, and compare the generated TPE value to other TPEs, industry standards and/or other benchmarks.

The thermal management unit 232 may be configured to monitor and manage the wireless devices surface/skin temperatures and/or the ongoing consumption of power by the active components that generate thermal energy in the wireless device. The thermal management unit 232 may intelligently and dynamically determine whether to throttle the performance of active processing components (e.g., CPU, GPU, liquid crystal display (LCD) brightness), the processors that should be throttled, the level to which the frequency of the processors should be throttled, when the throttling should occur, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processors 252, 260 may be interconnected to the power management unit 254, the mmWave transceivers 256, memory 258, and various additional processors 260 via the interconnection/bus module 226. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the SIP 200 discussed above, the various aspects may be implemented in a wide variety of computing systems, which may include a single processor, multiple processors, multicore processors, or any combination thereof.

Figure 3:
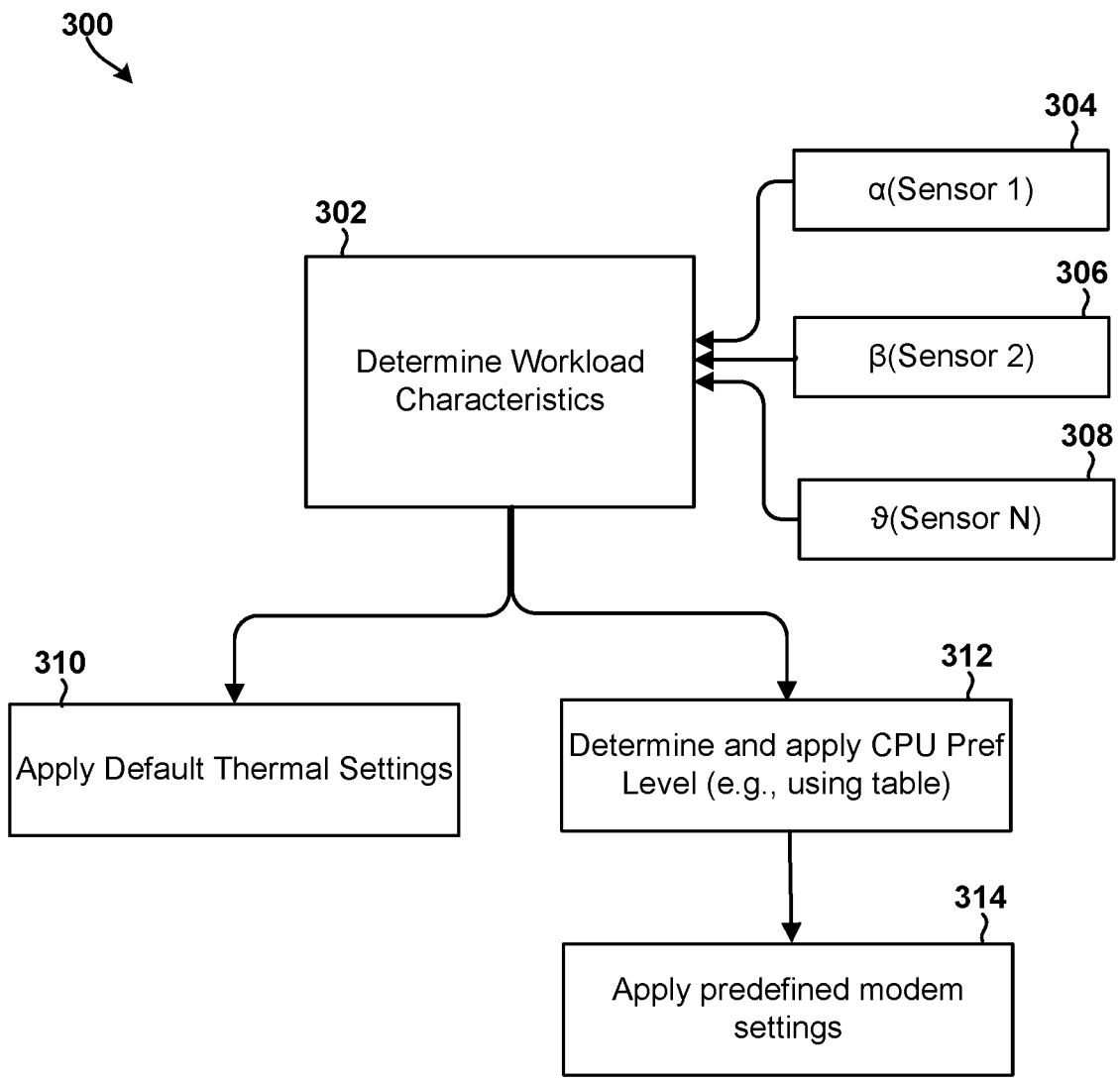
FIG. 3 is a process flow diagram illustrating a method of implementing dynamic thermal management for enhancing thermal performance in 5G enabled devices in accordance with various aspects of the present disclosure.

FIG. 3 illustrates a method 300 of implementing dynamic thermal management for enhancing thermal performance in 5G enabled devices in accordance with an aspect. The method 300 may be performed by a processor or a CPU in a wireless device, such as the application processor 216 or a thermal management unit 232 of the first SOC 202 illustrated in FIG. 2.

In block 302, the processor may receive inputs from the temperature sensors 304, 306, 308, and determine from such temperature sensor inputs characteristics of the workload of the wireless device. For example, the processor may use the inputs from the temperature sensors 304-308 to determine whether the workload is a 5G modem-centric workload in block 302. As another example, the processor may use the inputs from the temperature sensors 304-308 to determine whether the workload is a CPU-centric workload in block 302.

In block 310, the processor may apply an appropriate thermal policy or settings based on the determined characteristics of workload. For example, the processor may apply a default or conventional thermal policy or settings in block 310 in response to determining that the workload is a CPU-centric workload or is not 5G-centric.

In block 312, the processor may determine and apply a CPU preference level (e.g., as part of a modem-centric thermal management policy, etc.) based on the characteristics of workload. For example, the processor may apply a thermal policy or settings appropriate for managing temperatures when the workload is 5G-centric in block 310 in response to determining that the workload is a 5G modem-centric workload. In block 314, the processor may apply predefined modem settings to enhance thermal performance of the wireless device.

The method 300 may be repeated continuously or periodically such that when temperature readings indicate a change in the nature of the workload, the processor may change the thermal management policy or settings accordingly.

Figure 4:
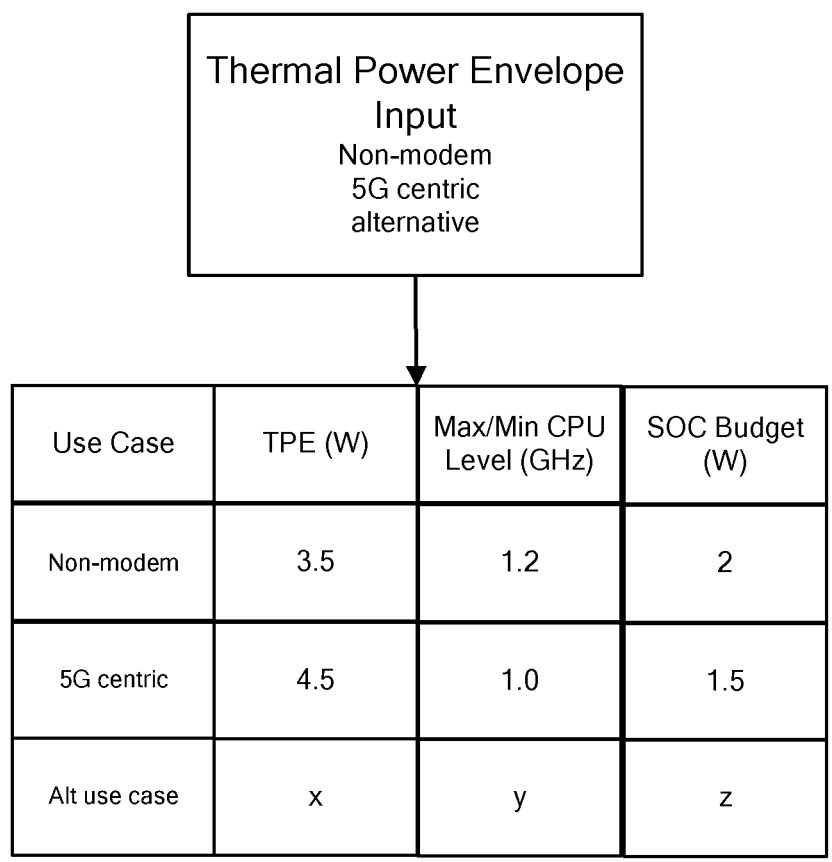
FIG. 4 is an illustration of workload or use case lookup table that may be used to select thermal power envelops and determine a thermal management policy in accordance with an aspect of the present disclosure.

FIG. 4 illustrates an example workload or use case lookup table 400 that may be used to select thermal power envelops and determine a thermal management policy in accordance with an aspect. In an aspect, a processor in a wireless device may use the lookup table 400 to determine and apply a CPU preference level (e.g., as part of block 312 illustrated in FIG. 3).

Figure 5:
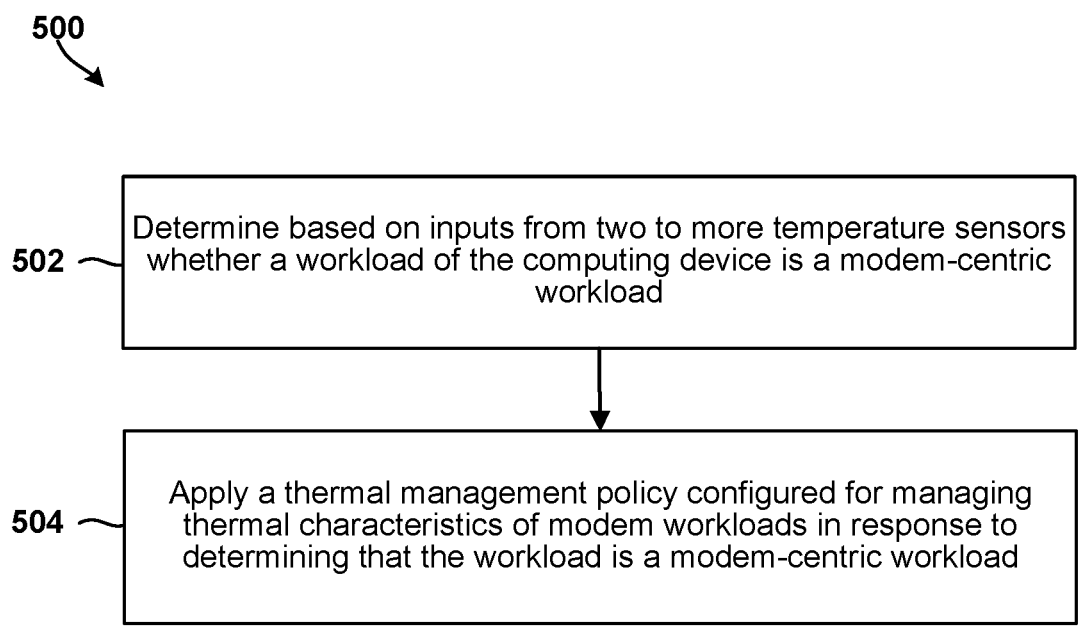
FIGS. 5 through 8 are process flow diagrams illustrating methods of implementing dynamic thermal management for enhancing thermal performance in 5G enabled devices in accordance with various aspects of the present disclosure.

FIG. 5 illustrates a method of implementing dynamic thermal management for enhancing thermal performance in a 5G enabled device in accordance with an aspect. The method 500 may be performed by a processor or a CPU in a wireless device, such as the application processor 216 or the thermal management unit 232 of the first SOC 202 illustrated in FIG. 2.

In block 502, the processor may determine, based on inputs from two or more temperature sensors (e.g., temperature sensors 205, 230, 262a, 262b, etc.) whether a workload of the wireless device is a 5G modem-centric workload. As described above, this determination may be made based on comparisons of reading from the two or more temperature sensors, comparisons of rates of change of reading from the two or more temperature sensors, and/or variations in the readings from the two or more temperature sensors.

In block 504, the processor may apply a thermal management policy configured for managing thermal characteristics of modem workloads (e.g., 5G workloads) in response to determining that the workload is a modem-centric workload (e.g., a 5G modem-centric workload).

The method 500 may be repeated continuously or periodically such that when temperature readings indicate a change in the nature of the workload, the processor may change the thermal management policy or settings accordingly.

Figure 6:
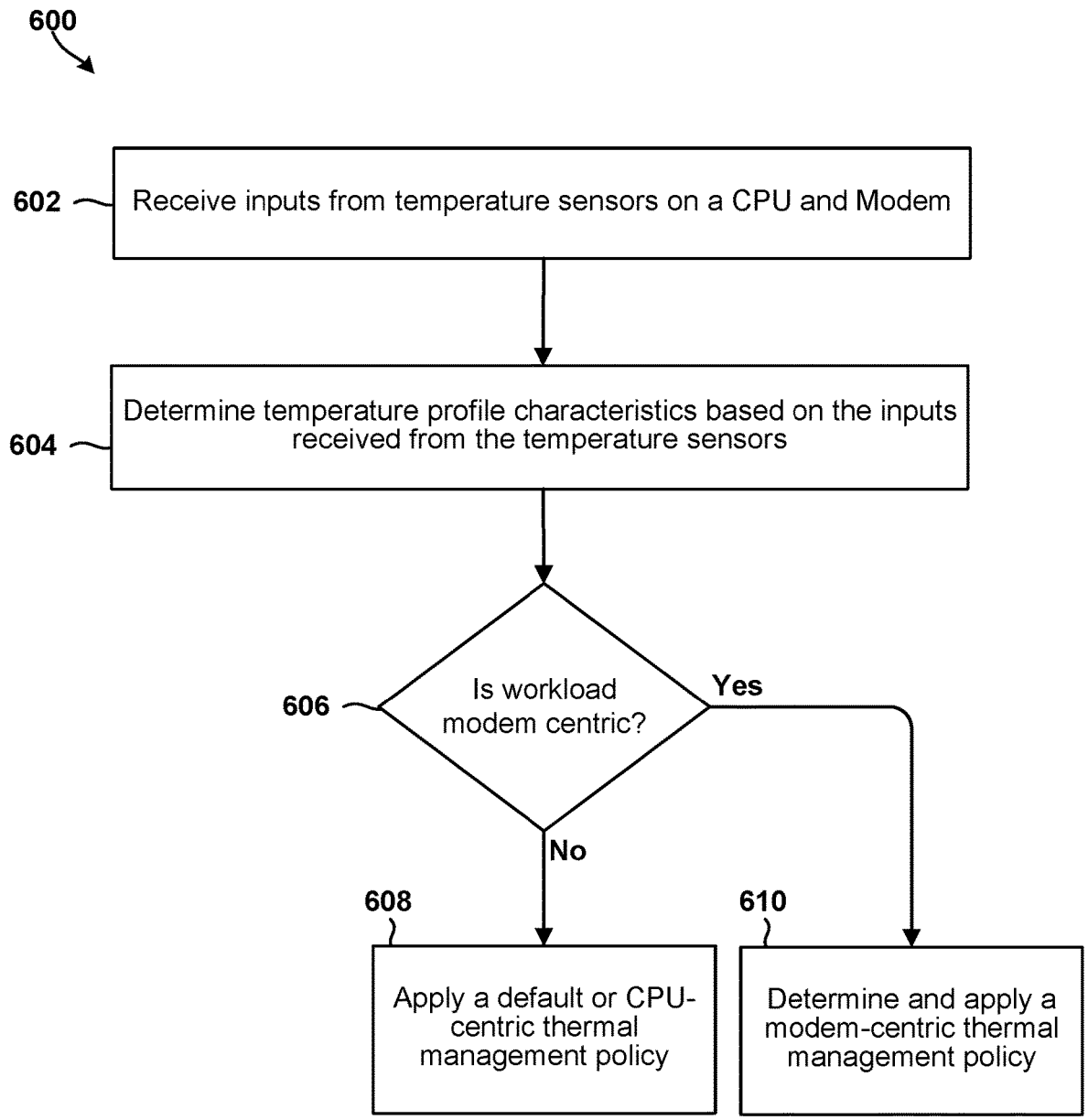

FIG. 6 illustrates a method of implementing dynamic thermal management for enhancing thermal performance in a 5G enabled device in accordance with an aspect. The method 600 may be performed by a processor or a CPU in a wireless device, such as the application processor 216 or the thermal management unit 232 of the first SOC 202 illustrated in FIG. 2.

In block 602, the processor may receive inputs from various temperature sensors on a CPU and Modem.

In block 604, the processor may determine the temperature profile characteristics of the workload based on the inputs received from the various temperature sensors.

In block 606, the processor may determine whether the workload is a modem-centric (e.g., 5G-centric) workload based on the determined temperature profile characteristics. For example, as described above, this determination may be made based on comparisons of reading from the various temperature sensors, comparisons of rates of change of reading from the various temperature sensors, and/or variations in the readings from the various temperature sensors.

In response to determining that the workload is not a modem-centric (e.g., 5G-centric) workload (i.e., determination block 606="No"), the processor may apply a default or CPU-centric thermal management policy in block 608.

In response to determining that the workload is a modem-centric (e.g., 5G-centric) workload (i.e., determination block 606="Yes"), the processor may determine and apply a modem-centric thermal management policy in block 610.

The method 600 may be repeated continuously or periodically such that when temperature readings indicate a change in the nature of the workload, the processor may change the thermal management policy or settings accordingly.

Figure 7:
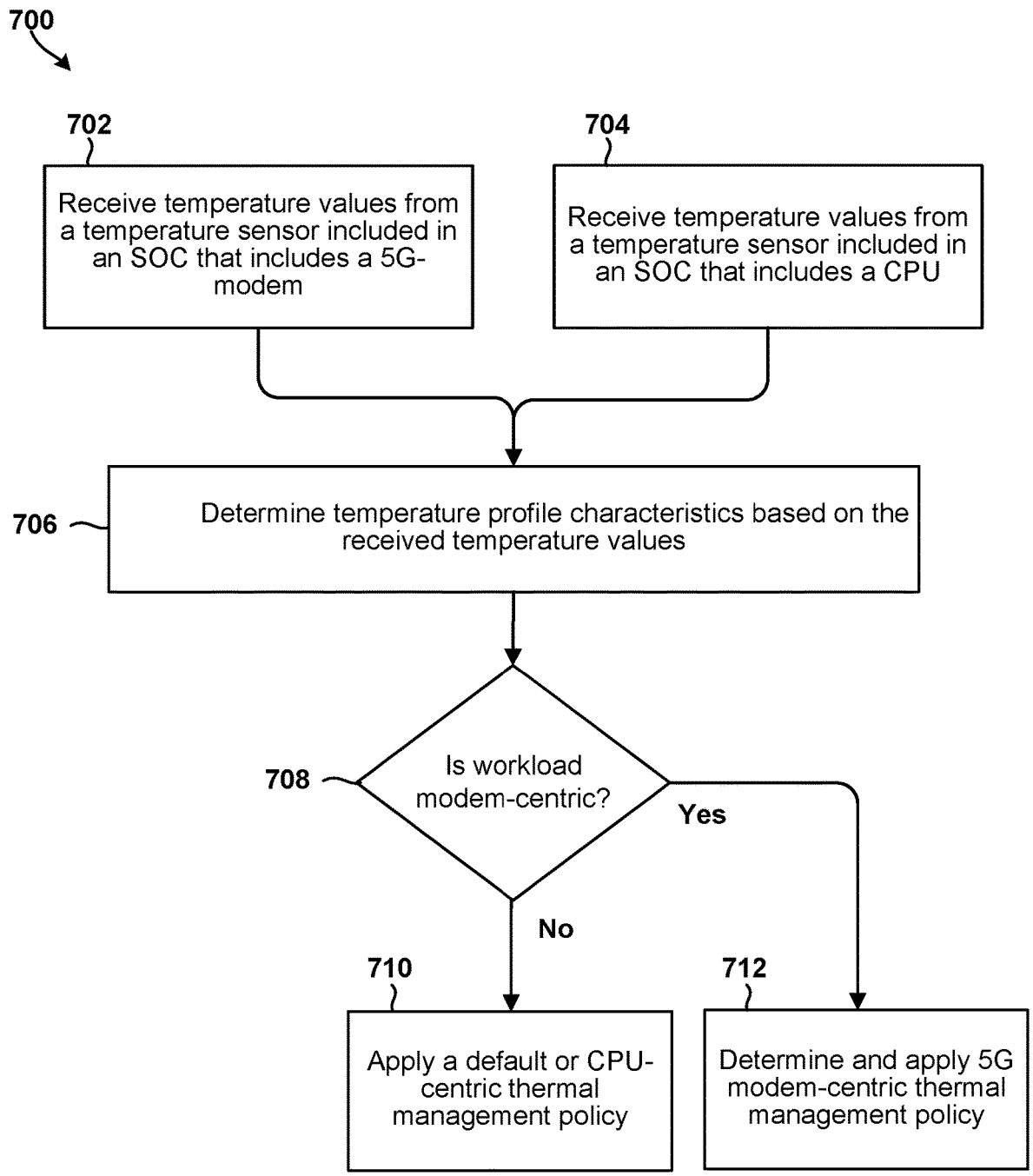

FIG. 7 illustrates a method of implementing dynamic thermal management for enhancing thermal performance in a 5G enabled device in accordance with an aspect. The method 700 may be performed by a processor or a CPU in a wireless device, such as the application processor 216 or the thermal management unit 232 of the first SOC 202 illustrated in FIG. 2.

In block 702, the processor may receive temperature values from a temperature sensor included in an SOC that includes a 5G-modem.

In block 704, the processor may receive temperature values from a temperature sensor included in an SOC that includes a CPU In block 706, the processor may determine temperature profile characteristics based on the received temperature values.

In block 708, the processor may determine whether the workload is a 5G modem centric workload based on the determined temperature profile characteristics.

In response to determining that the workload is not a 5G modem centric workload (i.e., determination block 708="No"), the processor may apply a default or CPU-centric thermal management policy in block 710.

In response to determining that the workload is a 5G-centric workload (i.e., determination block 708="Yes"), the processor may determine and apply a 5G modem-centric thermal management policy in block 712.

The method 700 may be repeated continuously or periodically such that when temperature readings indicate a change in the nature of the workload, the processor may change the thermal management policy or settings accordingly.

Figure 8:
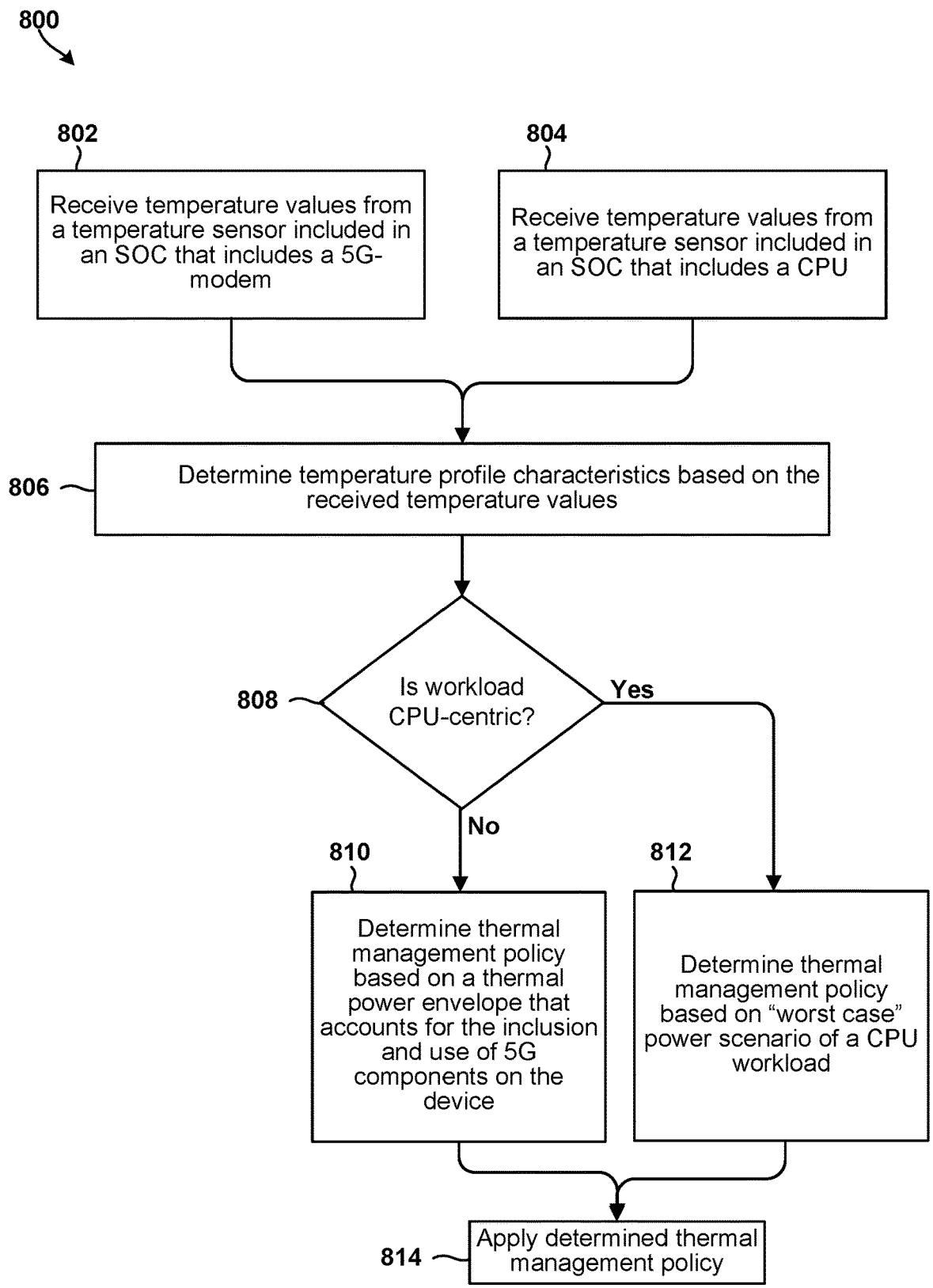

FIG. 8 illustrates a method of implementing dynamic thermal management for enhancing thermal performance in a 5G enabled device in accordance with an aspect. Method 800 may be performed by a processor or a CPU in a wireless device, such as the application processor 216 or the thermal management unit 232 of the first SOC 202 illustrated in FIG. 2.

In block 802, the processor may receive temperature values from a temperature sensor included in an SOC that includes a 5G-modem.

In block 804, the processor may receive temperature values from a temperature sensor included in an SOC that includes a CPU.

In block 806, the processor may determine temperature profile characteristics based on the received temperature values.

In block 808, the processor may determine whether the workload is a CPU-centric workload based on the determined temperature profile characteristics.

In response to determining that the workload is a CPU-centric workload (i.e., determination block 808="Yes"), the processor may determine a thermal management policy based on a "worst case" power scenario of a CPU workload in block 812.

In response to determining that the workload is not a CPU-centric centric workload (i.e., determination block 808="No"), the processor may determine thermal management policy based on a thermal power envelope that accounts for the inclusion and use of 5G components on the wireless device in block 810.

In block 814, the processor may apply the determined thermal management policy.

The method 800 may be repeated continuously or periodically such that when temperature readings indicate a change in the nature of the workload, the processor may change the thermal management policy or settings accordingly.

In an aspect, a processor in a wireless device (e.g., application processor 216 or the thermal management unit 232 of the first SOC 202 illustrated in FIG. 2) may be configured to receive a first temperature value from a first temperature sensor of the wireless device, receive a second temperature value from a second temperature sensor of the wireless device, determine a difference between the first temperature value and the second temperature value, generate a temperature profile value based on the difference between the first temperature value and the second temperature value, determine whether the temperature profile value exceeds a threshold value, implement a first thermal management policy in response to determining that the temperature profile value exceeds the threshold value, and implement a second thermal management policy in response to determining that the aggregated temperature value does not exceed the threshold value.

In an aspect, receiving the first temperature value from the first temperature sensor of the wireless device may include receiving the first temperature value from a modem temperature sensor that is sensitive to activity on a first modem of the wireless device. In an aspect, receiving the second temperature value from the second temperature sensor of the wireless device includes receiving the second temperature value from a neutral temperature sensor that is not sensitive to the activity on the first modem of the wireless device.

In an aspect, the method may further include throttling a component included in the second SOC based on the identified thermal management policy by adjusting the clock frequency of the component included in the SOC-CPU or adjusting the power level of the component included in the second SOC-CPU.

In an aspect, determining whether a workload present on the wireless device is a central processing unit centric workload or a modem-centric workload may be based on whether the aggregated temperature value exceeds the threshold value.

In an aspect, implementing the first thermal management policy in response to determining that the aggregated temperature value exceeds the threshold value may include implementing a thermal management policy for improved 5G modem performance.

In an aspect, implementing the second thermal management policy in response to determining that the aggregated temperature value does not exceed the threshold value includes implementing a thermal management policy for improved central processing unit performance.

The various aspects may be implemented on a variety of computing system, an example of which is illustrated in FIG. 8 in the form of a smartphone. A smartphone 800 may include a first SOC 202 (e.g., a SOC-CPU) coupled to a second SOC 204 (e.g., a 5G capable SOC) and a temperature sensor 205. The first and second SOCs 202, 204 may be coupled to internal memory 906, a display 912, and to a speaker 914. Additionally, the smartphone 900 may include an antenna 904 for sending and receiving electromagnetic radiation that may be connected to a wireless data link and/or cellular telephone transceiver 908 coupled to one or more processors in the first and/or second SOCs 202, 204. Smartphones 900 typically also include menu selection buttons or rocker switches 920 for receiving user inputs.

A typical smartphone 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 908 and CODEC 910 may include a digital signal processor (DSP) circuit (not shown separately).

The processors may be any programmable microprocessor, microcomputer or multiple processor chip or chips that can be configured by software instructions (applications) to perform a variety of functions, including the functions of the various aspects described in this application. In some wireless devices, multiple processors may be provided, such as one processor dedicated to wireless communication functions and one processor dedicated to running other applications. Typically, software applications may be stored in the internal memory 906 before they are accessed and loaded into the processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The various aspects provide improved methods, systems, and devices for conserving power and improving performance in multicore processors and systems-on-chip. The inclusion of multiple independent cores on a single chip, and the sharing of memory, resources, and power architecture between cores, gives rise to a number of power management issues not present in more distributed multiprocessing systems. Thus, a different set of design constraints may apply when designing power management and voltage/frequency scaling strategies for multicore processors and systems-on-chip than for other more distributed multiprocessing systems.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method of managing thermal energy in a wireless device, comprising:
   determining, by a processor of the wireless device, based on inputs from two or more temperature sensors including a first temperature sensor that is sensitive to activities of a modem processor, whether a workload of the wireless device is a modem-centric workload or a central processing unit centric workload, the determining including:
      determining, by the processor, a difference in variation between values received from the first temperature sensor and a second temperature sensor of the two or more temperature sensors;
      determining, by the processor, whether there has been an increase in activity of the modem processor based on the difference in variation between values received from the first temperature sensor and the second temperature sensor; and
      determining the workload of the wireless device is a modem-centric workload in response to determining the increase in the activity of the modem processor exceeds a threshold value; and
   applying, by the processor, a thermal management policy configured for managing thermal characteristics of modem workloads in response to determining that the workload is a modem-centric workload.

2. The method of claim 1, wherein,
   the second temperature sensor is less sensitive to the activities of the modem processor.

3. The method of claim 1, wherein applying the thermal management policy configured for managing thermal characteristics of modem workloads in response to determining that the workload is a modem-centric workload comprises throttling a component of the wireless device.

4. The method of claim 3, wherein throttling the component comprises:
   adjusting a clock frequency of the component; or
   adjusting a power level of the component.

5. The method of claim 1, further comprising determining, by the processor, one or more temperature profile characteristics based on the inputs from two or more temperature sensors, wherein the difference in variation between values received from the first temperature sensor and the second temperature sensor is determined based on the one or more temperature profile characteristics.

6. A wireless device, comprising:
   two or more temperature sensors including a first temperature sensor that is sensitive to activities of a modem processor and a second temperature sensor; and
   a processor operably coupled to the two or more temperature sensors and configured with processor-executable instructions to:
      determine based on inputs from the two or more temperature sensors whether a workload of the wireless device is a modem-centric workload or a central processing unit centric workload, the processor, to determine whether the workload of the wireless device is a modem-centric workload or a central processing unit centric workload, further configured with process-executable instructions to:
         determine a difference in variation between values received from the first temperature sensor and the second temperature sensor;
         determine whether there has been an increase in activity of the modem processor based on the difference in variation between values received from the first temperature sensor and the second temperature sensor; and
         determine the workload of the wireless device is a modem-centric workload in response to determining the increase in the activity of the modem processor exceeds a threshold value; and
      apply a thermal management policy configured for managing thermal characteristics of modem workloads in response to determining that the workload is a modem-centric workload.

7. The wireless device of claim 6, wherein,
   the second temperature sensor is less sensitive to the activities of the modem processor.

8. The wireless device of claim 6, wherein the processor is further configured with processor-executable instructions to apply the thermal management policy configured for managing thermal characteristics of modem workloads in response to determining that the workload is a modem-centric workload by throttling a component of the wireless device.

9. The wireless device of claim 8, wherein the processor is further configured with processor-executable instructions to throttle the component by:
   adjusting a clock frequency of the component; or
   adjusting a power level of the component.

10. The wireless device of claim 6, wherein the processor is further configured with processor-executable instructions to determine one or more temperature profile characteristics based on the inputs from two or more temperature sensors, wherein the difference in variation between values received from the first temperature sensor and the second temperature sensor is determined based on the one or more temperature profile characteristics.

11. A non-transitory processor-readable medium having stored thereon processor-executable instructions configured to cause a processor of a wireless device to perform operations comprising:
   determining, based on inputs from two or more temperature sensors including a first temperature sensor that is sensitive to activities of a modem processor, whether a workload of the wireless device is a modem-centric workload or a central processing unit centric workload, the determining including:
      determining a difference in variation between values received from the first temperature sensor and a second temperature sensor of the two or more temperature sensors;
      determining whether there has been an increase in activity of the modem processor based on the difference in variation between values received from the first temperature sensor and the second temperature sensor; and
      determining the workload of the wireless device is a modem-centric workload in response to determining the increase in the activity of the modem processor exceeds a threshold value; and applying a thermal management policy configured for managing thermal characteristics of modem workloads in response to determining that the workload is a modem-centric workload.

12. The non-transitory processor-readable medium of claim 11, wherein the second temperature sensor is less sensitive to the activities of the modem processor.

13. The non-transitory processor-readable medium of claim 11, wherein the stored processor-executable instructions are configured to cause the processor of the wireless device to perform operations such that applying the thermal management policy configured for managing thermal characteristics of modem workloads in response to determining that the workload is a modem-centric workload comprises throttling a component of the wireless device.

14. The non-transitory processor-readable medium of claim 13, wherein the stored processor-executable instructions are configured to cause the processor of the wireless device to perform operations such that throttling the component comprises:
    adjusting a clock frequency of the component; or
    adjusting a power level of the component.

15. The non-transitory processor-readable medium of claim 11, wherein the stored processor-executable instructions are configured to cause the processor of the wireless device to perform operations further comprising determining one or more temperature profile characteristics based on the inputs from two or more temperature sensors, wherein the difference in variation between values received from the first temperature sensor and the second temperature sensor is determined based on the one or more temperature profile characteristics.

16. A wireless device, comprising:
    means for determining, based on inputs from two or more temperature sensors including a first temperature sensor that is sensitive to activities of a modem processor, whether a workload of the wireless device is a modem-centric workload or a central processing unit centric workload, the means for determining including:
        means for determining a difference in variation between values received from the first temperature sensor and a second temperature sensor of the two or more temperature sensors;
        means for determining whether there has been an increase in activity of the modem processor based on the difference in variation between values received from the first temperature sensor and the second temperature sensor; and
        means for determining the workload of the wireless device is a modem- centric workload in response to determining the increase in the activity of the modem processor exceeds a threshold value; and
    means for applying a thermal management policy configured for managing thermal characteristics of modem workloads in response to determining that the workload is a modem-centric workload.

17. The wireless device of claim 16, wherein the second temperature sensor is less sensitive to the activities of the modem processor.

18. The wireless device of claim 16, wherein means for applying the thermal management policy configured for managing thermal characteristics of modem workloads in response to determining that the workload is a modem-centric workload comprises means for throttling a component of the wireless device.

19. The wireless device of claim 18, wherein means for throttling the component comprises:
    means for adjusting a clock frequency of the component; or
    means for adjusting a power level of the component.

20. The wireless device of claim 16, further comprising means for determining one or more temperature profile characteristics based on the inputs from two or more temperature sensors, wherein the difference in variation between values received from the first temperature sensor and the second temperature sensor is determined based on the one or more temperature profile characteristics.

* * * * *